United States Patent [19]
Weimers

[11] Patent Number: 5,910,888
[45] Date of Patent: Jun. 8, 1999

[54] PLANT FOR TRANSMITTING ELECTRIC POWER

[75] Inventor: Lars Weimers, Ludvika, Sweden

[73] Assignee: Asea Brown Boveri AB, Vasteras, Sweden

[21] Appl. No.: 08/921,079

[22] Filed: Aug. 29, 1997

[30] Foreign Application Priority Data

Mar. 24, 1997 [SE] Sweden .................................. 9701066

[51] Int. Cl.⁶ ..................................................... H02J 3/36
[52] U.S. Cl. .............................................. 363/35; 363/51
[58] Field of Search ................................ 363/34, 35, 37, 363/50, 51; 174/68.1, 110 R, 110 SR, 110 PM, 110 S

[56] References Cited

U.S. PATENT DOCUMENTS

| | | | |
|---|---|---|---|
| 4,153,752 | 5/1979 | MacKenzie, Jr. et al. | 428/379 |
| 4,941,079 | 7/1990 | Ooi | 363/132 |
| 5,010,467 | 4/1991 | Tokiwa et al. | 363/37 |
| 5,535,113 | 7/1996 | Konishi | 363/35 |
| 5,644,482 | 7/1997 | Asplund | 363/35 |

OTHER PUBLICATIONS

Anders Lindberg, PWM and control of two and three level high power voltage source converters, pp. 1–3, Royal Institute of Technology, Stockholm 1995.

*Primary Examiner*—Peter S. Wong
*Assistant Examiner*—Y. J. Han
*Attorney, Agent, or Firm*—Pollock, Vande Sande & Amernick

[57] ABSTRACT

A plant for transmitting electric power between at least two alternating voltage networks which are each connected through a station to a direct voltage network for high voltage direct current. The stations transmit power between the direct voltage network and the respective alternating voltage networks. At least one VSC converter is in each station to convert direct voltage to alternating voltage and the converse. A cable with an insulating layer of polymer base surrounding a conductor forms the direct voltage network connecting the stations.

6 Claims, 1 Drawing Sheet

PLANT FOR TRANSMITTING ELECTRIC POWER

BACKGROUND OF THE INVENTION

The present invention relates to a plant for transmitting electric power between a direct voltage network for High Voltage Direct Current (HVDC), and at least two alternating voltage networks connected thereto through a station with each of the stations being adapted to perform transmission of electric power between the direct voltage network and a respective one of the alternating voltage networks.

In such plants, according to the prior art, primarily uninsulated overhead lines have been used to implement a direct voltage network interconnecting stations which may be located very large distances apart, for example, 1000 km. However, such overhead lines have a significant disturbing influence upon the country and the living things where they exist. The alternative has been to use cables having an inner conductor surrounded by a thick insulating layer formed by a paper impregnated by oil, but such cables are so costly that they are not a realistic alternative to overhead lines. Experiments have been carried out with cables having a conductor and an insulating layer on a polymer base surrounding the conductor for transmitting High Voltage Direct Current (HVDC), but these experiments have revealed great problems in using this type of cable for transmitting High Voltage Direct Current (HVDC), since space charges are created in the insulating layer which may cause breakthroughs and breakdowns in the cables. The space charges are caused by the changes of polarity which the conductor is subjected to when the feeding direction of the power transmitted between the direct voltage network and an alternating voltage network is changed. A result of these problems is that overhead lines have been used for transmitting High Voltage Direct Current (HVDC) over land, and cables having tailor made insulating sheets have been used as sea cables for transmitting between land areas separated by water.

SUMMARY OF THE INVENTION

The object of the present invention is to provide a plant of the type defined in the introduction, through which the problems mentioned above are reduced.

This object is, according to the invention, obtained by combining in such a plant, on the one hand, an arrangement of at least one voltage-stiff VSC-converter in each station for converting direct voltage to alternating voltage, and conversely, and on the other hand, the arrangement of at least one cable with an insulating layer of polymer base surrounding the conductor thereof for forming the direct voltage network interconnecting the stations.

This combination provides very positive results. By using a voltage-stiff, VSC-converter for converting direct voltage into alternating voltage and the converse, in the stations of the plant which utilize power semiconductor devices of turn-off type, no change of polarity of the conductor of the direct voltage network cable is ever carried out, so that the problems mentioned above of breakthroughs and breakdowns in the cable as a consequence of the space charge effect in the cables having a conductor surrounded by an insulating layer of polymer base disappear. Thus, the present inventors have realized that, in spite of the indications in the opposite direction given by the experiments discussed above, it is possible to use this type of cable because of the near disappearance of the space charge problem in the combination. This type of cable has previously been used for alternating voltage transmission, but it had to be provided with a considerably thicker insulating layer than in the case of direct voltage transmission. Thus, the line cost may be lowered considerably for transmission of High Voltage Direct Current through this type of cable with respect to transmission of alternating voltage by such cables.

Cables of this type having a conductor surrounded by an insulating layer of polymer base may be produced at a far lower cost than the cables mentioned above which have a conductor surrounded by an insulating layer based on paper impregnated by oil. This means that such cables become an alternative to overhead lines and are attractive from a cost point of view. It is now possible to remove all the inconveniences of such overhead lines without any substantial negative consequences with respect to costs.

The invention is based upon the understanding that it is possible to use cables previously thought unsuitable for this purpose. The cables having a conductor surrounded by an insulating layer of polymer base for transmitting High Voltage Direct Current by combining them with voltage-stiff VSC-converters in the stations for transmitting power between the direct voltage network and alternating voltage networks connected thereto at the stations. The space charge problems mentioned above are, namely through exactly this combination, reduced to a very high degree and this is the essence of the invention, but it is emphasized that no insulating layer of polymer base whatsoever of any standard material should be used, but materials developed particularly for this application should be used in a plant of this type to obtain optimum characteristics of the cable, such as withstanding capability, insulating capability, and avoiding breakthroughs.

According to a preferred embodiment of the invention, the cable is an extruded cable. Such a cable may be produced at a cost and a quality that it would be very advantageous to use it in combination with voltage-stiff VSC-converters in stations in a plant for transmitting High Voltage Direct Current.

The invention relates also to a method of using a cable having an inner conductor for electricity and an insulating layer of polymer base surrounding the conductor for forming the direct voltage network interconnecting the stations in transmitting electric power through High Voltage Direct Current (HVDC), in which each station has at least one voltage-stiff VSC-converter for converting direct voltage to alternating voltage and the converse. The advantages of such a new use, according to the invention, appear from the above discussion of the plant according to the invention.

Further advantages and features of the invention appear from the following description.

BRIEF DESCRIPTION OF THE DRAWINGS

With reference to the appended drawings, below follows a description of preferred embodiments of the invention.

In the drawings.

DETAILED DESCRIPTION OF PREFERRED EMBODIMENTS OF THE INVENTION

Figure 1:
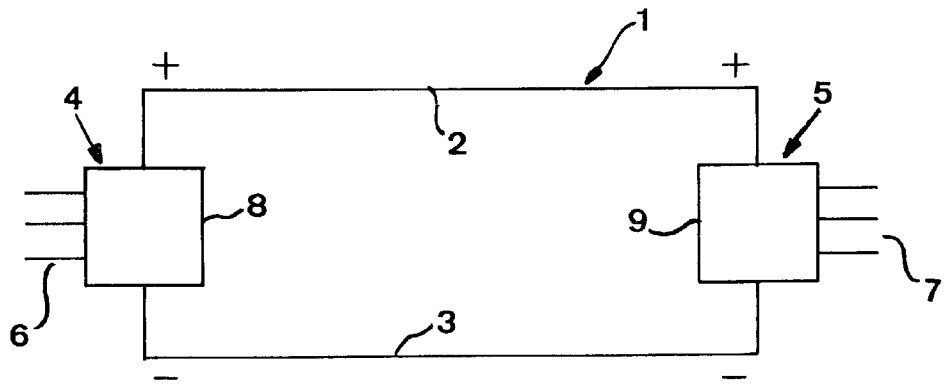
FIG. 1 is a schematic block diagram illustrating a plant according to a first preferred embodiment of the invention.

A plant for transmitting electric power according to a preferred embodiment of the invention is schematically illustrated in FIG. 1. The plant comprises a direct voltage network 1 for High Voltage Direct Current (HVDC) having two cables 2, 3 with an inner conductor surrounded by an insulating layer of polymer base, for example, extruded cables, for interconnecting two stations 4, 5. These stations are adapted for transmitting electric power between the direct voltage network 1 and an alternating voltage network 6, 7 connected to each respective station. It is shown that the alternating voltage network has three phases, but another number of phases is also possible. One of the cables (2) is intended to be on positive potential of half the direct voltage of the direct voltage network, while the other cable is on negative potential of half the direct voltage. The direct voltage may in operation typically be between 50 and 500 kV.

Each station is indicated only through a voltage-stiff VSC-converter 8, 9 (Voltage Source Converter). It is, of course, also possible that one station comprises several such converters. The respective VSC-converter comprises, in a conventional way, so-called valves, which consist of branches of breakers of turn-on and turn-off type connected in series, preferably in the form of IGBTs, and diodes connected in anti-parallel therewith. A great number of IGBTs may, for example, be connected in series in one single valve to be turned on and turned off simultaneously so as to function as one single breaker, whereby the voltage across the valve is distributed among the different breakers connected in series. The control of the breakers is, in a conventional way, carried out by pulse width modulation (PWM). The stations 4, 5 may very well be spaced at distances as great as 1000 km.

By using voltage-stiff converters in the HVDC-plant, it is necessary to change the direction of the current through the valves only when the direction of the power feed between the direct voltage network and the alternating voltage network is to be changed, so that there will be no problem with breakthrough and breakdown in the cable as a consequence of space charges caused by the polarity change of the cable. This means that a cable having an insulating layer of polymer base surrounding the conductor may be used to connect the two stations 4, 5. Such a cable will be less costly than the cables so far available for transmitting High Voltage Direct Current (HVDC), which are very expensive as a consequence of complicated production processes. Accordingly, a cable having a price in the range of that of overhead lines may be used, and it will, in most cases, be preferable with respect to overhead lines because of the fact that it is considerably easier to arrange such cables without any environmental problems than to arrange overhead lines.

Figure 2:
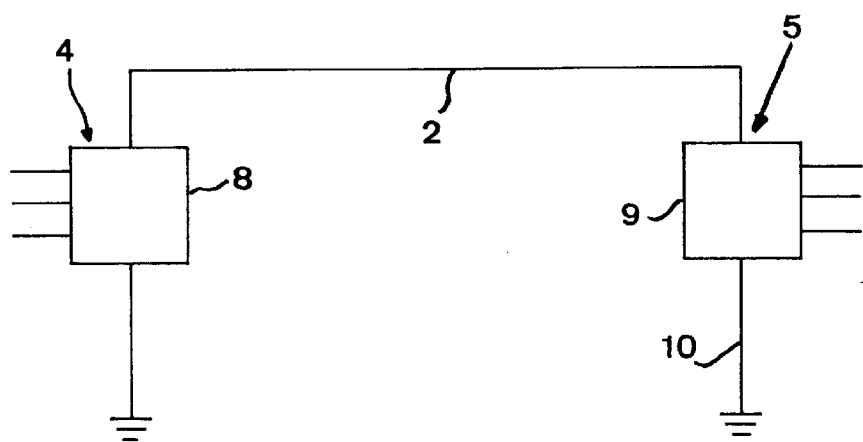
FIG. 2 is a view corresponding to FIG. 1 of a plant according to a second preferred embodiment of the invention.

Another possible preferred embodiment of a plant according to the invention is illustrated in FIG. 2, which differs from that shown in FIG. 1 in that one single cable 2 having a conductor surrounded by an insulating layer of polymer base connects the two stations, 4, 5, which are provided with an earth return circuit 10. Thus, the cable 2 is in this embodiment on direct voltage potential.

Figure 3:
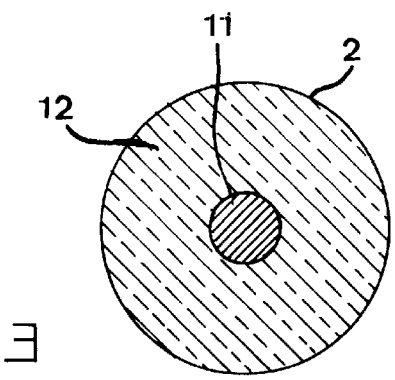
FIG. 3 is a simplified cross-section through a cable used between stations of the plants according to FIGS. 1 and 2.

Finally, FIG. 3 illustrates a cable 2 used in a plant according to the invention, which has an inner conductor 11 for conducting High Voltage Direct Current (HVDC) and an insulating layer 12 of polymer base surrounding it, which may be produced by extrusion.

The invention is of course not in any way restricted to the preferred embodiments described above, but many alternatives and modifications thereof will be apparent to one skilled in the art without departing from the basic idea of the invention. As an example of such a modification, the number of stations of such a plant can be higher than two.

I claim:

1. A plant for transmitting electric power between at least two alternating voltage networks, each connected through a station to a direct voltage network for high voltage direct current, each station being adapted to transmit electric power between the direct voltage network and the respective alternating voltage network, said plant comprising:

at least one voltage-stiff VSC converter in each station adapted to convert direct voltage to alternating voltage and the alternating voltage to direct voltage, wherein said electric power is fed in both directions in said direct voltage network between the stations; and at least one cable with an insulating layer of polymer base surrounding a conductor, said cable forming the direct voltage network connecting the stations.

2. A plant according to claim 1 wherein the cable is an extruded cable.

3. A plant according to claim 1 wherein two cables interconnect each station, one cable forming the positive pole of the direct voltage network and the other cable forming the negative pole.

4. A plant according to claim 1 wherein one cable interconnects the stations and each respective station is provided with an earth return circuit.

5. A plant according to claim 1 wherein the direct voltage network has an operating voltage in the range of 50–500 kV.

6. A method of using a cable comprising the steps of:

providing a cable having an inner conductor for electricity and an insulating layer of polymer base surrounding the conductor, and;

forming a direct voltage network from the cable which interconnects stations having at least one voltage stiff VSC converter for the transmission of electric power, wherein said electric power is fed in both directions in the direct voltage network between the stations.

\* \* \* \* \*